(12) United States Patent
Ziauddin et al.

(10) Patent No.: US 7,805,411 B2
(45) Date of Patent: Sep. 28, 2010

(54) AUTO-TUNING SQL STATEMENTS

(75) Inventors: Mohamed Ziauddin, Pleasanton, CA (US); Benoit Dageville, Foster City, CA (US); Mohamed Zait, San Jose, CA (US); Dinesh Das, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 568 days.

(21) Appl. No.: 10/935,908

(22) Filed: Sep. 7, 2004

(65) Prior Publication Data

US 2005/0120000 A1 Jun. 2, 2005

Related U.S. Application Data

(60) Provisional application No. 60/500,490, filed on Sep. 6, 2003.

(51) Int. Cl.
*G06F 7/00* (2006.01)
*G06F 17/00* (2006.01)

(52) U.S. Cl. .................. 707/688; 707/705; 707/713; 707/719

(58) Field of Classification Search .................. 707/2
See application file for complete search history.

(56) References Cited

U.S. PATENT DOCUMENTS

| | | | |
|---|---|---|---|
| 5,140,685 A | 8/1992 | Sipple et al. | |
| 5,260,697 A | 11/1993 | Barrett et al. | |
| 5,398,183 A | 3/1995 | Elliott | |
| 5,408,653 A | 4/1995 | Josten et al. | |
| 5,481,712 A | 1/1996 | Silver et al. | |
| 5,504,917 A | 4/1996 | Austin | |
| 5,544,355 A | 8/1996 | Chaudhuri et al. | |
| 5,577,240 A | 11/1996 | Demers et al. | |
| 5,634,134 A | 5/1997 | Kumai et al. | |
| 5,724,569 A | 3/1998 | Andres | |
| 5,737,601 A | 4/1998 | Jain et al. | |
| 5,761,660 A | 6/1998 | Josten et al. | |
| 5,765,159 A | 6/1998 | Srinivasan | |
| 5,781,912 A | 7/1998 | Demers et al. | |
| 5,794,227 A * | 8/1998 | Brown ........................ 707/2 |
| 5,794,229 A | 8/1998 | French et al. | |
| 5,806,076 A | 9/1998 | Ngai et al. | |
| 5,860,069 A | 1/1999 | Wright | |
| 5,870,760 A | 2/1999 | Demers et al. | |
| 5,870,761 A | 2/1999 | Demers et al. | |
| 5,940,826 A | 8/1999 | Heideman et al. | |
| 5,963,933 A | 10/1999 | Cheng et al. | |
| 5,963,934 A | 10/1999 | Cochrane et al. | |
| 5,991,765 A | 11/1999 | Vethe | |

(Continued)

OTHER PUBLICATIONS

Markl et al.; "Learning Table Access Cardinalities with LEO;" SIGMOD '02; Jun. 3-6, 2002; p. 613.*

(Continued)

*Primary Examiner*—Jay A Morrison
(74) *Attorney, Agent, or Firm*—Vista IP Law Group, LLP.

(57) ABSTRACT

Auto-tuning can be performed by receiving a database query language statement and performance information related to the statement, determining whether one or more performance statistics of the statement are available or missing in the performance information, and determining an auto-tuning hint for each missing statistic.

44 Claims, 4 Drawing Sheets

U.S. PATENT DOCUMENTS

| | | | |
|---|---|---|---|
| 6,052,694 A * | 4/2000 | Bromberg | 707/200 |
| 6,122,640 A | 9/2000 | Pereira | |
| 6,195,653 B1 | 2/2001 | Bleizeffer et al. | |
| 6,212,514 B1 | 4/2001 | Eberhard et al. | |
| 6,275,818 B1 | 8/2001 | Subramanian et al. | |
| 6,321,218 B1 | 11/2001 | Guay et al. | |
| 6,330,552 B1 * | 12/2001 | Farrar et al. | 705/400 |
| 6,349,310 B1 | 2/2002 | Klein et al. | |
| 6,353,818 B1 | 3/2002 | Carino, Jr. | |
| 6,356,889 B1 | 3/2002 | Lohman et al. | |
| 6,366,901 B1 * | 4/2002 | Ellis | 707/2 |
| 6,366,903 B1 | 4/2002 | Agrawal et al. | |
| 6,374,257 B1 | 4/2002 | Guay et al. | |
| 6,397,207 B1 | 5/2002 | Bleizeffer et al. | |
| 6,397,227 B1 | 5/2002 | Klein et al. | |
| 6,434,545 B1 | 8/2002 | MacLeod et al. | |
| 6,434,568 B1 | 8/2002 | Bowman-Amuah | |
| 6,442,748 B1 | 8/2002 | Bowman-Amuah | |
| 6,460,027 B1 * | 10/2002 | Cochrane et al. | 707/2 |
| 6,460,043 B1 | 10/2002 | Tabbara et al. | |
| 6,493,701 B2 | 12/2002 | Ponnekanti | |
| 6,496,850 B1 | 12/2002 | Bowman-Amuah | |
| 6,513,029 B1 | 1/2003 | Agrawal et al. | |
| 6,529,901 B1 | 3/2003 | Chaudhuri et al. | |
| 6,560,606 B1 | 5/2003 | Young | |
| 6,571,233 B2 * | 5/2003 | Beavin et al. | 707/2 |
| 6,594,653 B2 | 7/2003 | Colby et al. | |
| 6,598,038 B1 | 7/2003 | Guay et al. | |
| 6,615,223 B1 | 9/2003 | Shih et al. | |
| 6,701,345 B1 | 3/2004 | Carley et al. | |
| 6,714,943 B1 | 3/2004 | Ganesh et al. | |
| 6,721,724 B1 | 4/2004 | Galindo-Legaria et al. | |
| 6,728,719 B1 | 4/2004 | Ganesh et al. | |
| 6,728,720 B1 | 4/2004 | Lenzie | |
| 6,744,449 B2 | 6/2004 | MacLeod et al. | |
| 6,763,353 B2 | 7/2004 | Li et al. | |
| 6,804,672 B1 | 10/2004 | Klein et al. | |
| 6,816,874 B1 | 11/2004 | Cotner et al. | |
| 6,839,713 B1 | 1/2005 | Shi et al. | |
| 6,850,925 B2 * | 2/2005 | Chaudhuri et al. | 707/2 |
| 6,865,567 B1 | 3/2005 | Oommen et al. | |
| 6,910,109 B2 | 6/2005 | Holman et al. | |
| 6,912,547 B2 | 6/2005 | Chaudhuri et al. | |
| 6,915,290 B2 | 7/2005 | Bestgen et al. | |
| 6,931,389 B1 | 8/2005 | Bleizeffer et al. | |
| 6,934,701 B1 | 8/2005 | Hall, Jr. | |
| 6,947,927 B2 * | 9/2005 | Chaudhuri et al. | 707/3 |
| 6,961,931 B2 | 11/2005 | Fischer | |
| 6,999,958 B2 | 2/2006 | Carlson et al. | |
| 7,007,013 B2 | 2/2006 | Davis et al. | |
| 7,031,958 B2 | 4/2006 | Santosuosso | |
| 7,047,231 B2 | 5/2006 | Grasshoff et al. | |
| 7,058,622 B1 | 6/2006 | Tedesco | |
| 7,080,062 B1 | 7/2006 | Leung et al. | |
| 7,139,749 B2 | 11/2006 | Bossman et al. | |
| 7,146,363 B2 | 12/2006 | Waas et al. | |
| 7,155,426 B2 | 12/2006 | Al-Azzawe | |
| 7,155,459 B2 | 12/2006 | Chaudhuri et al. | |
| 7,272,589 B1 | 9/2007 | Guay et al. | |
| 7,302,422 B2 | 11/2007 | Bossman et al. | |
| 7,353,219 B2 * | 4/2008 | Markl et al. | 707/2 |
| 2002/0073086 A1 | 6/2002 | Thompson et al. | |
| 2002/0120617 A1 | 8/2002 | Yoshiyama et al. | |
| 2002/0198867 A1 | 12/2002 | Lohman et al. | |
| 2003/0018618 A1 * | 1/2003 | Bestgen et al. | 707/3 |
| 2003/0065648 A1 | 4/2003 | Driesch et al. | |
| 2003/0088541 A1 | 5/2003 | Zilio et al. | |
| 2003/0093408 A1 | 5/2003 | Brown et al. | |
| 2003/0110153 A1 | 6/2003 | Shee | |
| 2003/0115183 A1 | 6/2003 | Abdo et al. | |
| 2003/0126143 A1 | 7/2003 | Roussopoulos et al. | |
| 2003/0130985 A1 | 7/2003 | Driesen et al. | |
| 2003/0135478 A1 | 7/2003 | Marshall et al. | |
| 2003/0154216 A1 | 8/2003 | Arnold et al. | |
| 2003/0177137 A1 | 9/2003 | MacLeod et al. | |
| 2003/0182276 A1 * | 9/2003 | Bossman et al. | 707/3 |
| 2003/0187831 A1 | 10/2003 | Bestgen et al. | |
| 2003/0200204 A1 | 10/2003 | Limoges et al. | |
| 2003/0200537 A1 | 10/2003 | Barsness et al. | |
| 2003/0229621 A1 | 12/2003 | Carlson et al. | |
| 2003/0229639 A1 | 12/2003 | Carlson et al. | |
| 2004/0002957 A1 | 1/2004 | Chaudhuri et al. | |
| 2004/0003004 A1 | 1/2004 | Chaudhuri et al. | |
| 2004/0019587 A1 | 1/2004 | Fuh et al. | |
| 2004/0034643 A1 | 2/2004 | Bonner et al. | |
| 2004/0181521 A1 * | 9/2004 | Simmen | 707/3 |
| 2004/0210563 A1 | 10/2004 | Zait et al. | |
| 2004/0215626 A1 * | 10/2004 | Colossi et al. | 707/100 |
| 2005/0033734 A1 | 2/2005 | Chess et al. | |
| 2005/0097078 A1 | 5/2005 | Lohman et al. | |
| 2005/0097091 A1 | 5/2005 | Ramacher et al. | |
| 2005/0102305 A1 | 5/2005 | Chaudhuri et al. | |
| 2005/0119999 A1 | 6/2005 | Zait et al. | |
| 2005/0120000 A1 | 6/2005 | Ziauddin et al. | |
| 2005/0120001 A1 | 6/2005 | Yagoub et al. | |
| 2005/0125393 A1 | 6/2005 | Yagoub et al. | |
| 2005/0125398 A1 | 6/2005 | Das et al. | |
| 2005/0125427 A1 | 6/2005 | Dageville et al. | |
| 2005/0125452 A1 | 6/2005 | Ziauddin et al. | |
| 2005/0138015 A1 | 6/2005 | Dageville et al. | |
| 2005/0177557 A1 | 8/2005 | Ziauddin et al. | |
| 2005/0187917 A1 | 8/2005 | Lawande et al. | |
| 2005/0251523 A1 | 11/2005 | Rajamani et al. | |
| 2006/0004828 A1 | 1/2006 | Rajamani et al. | |
| 2006/0167883 A1 | 7/2006 | Boukobza | |
| 2007/0038618 A1 | 2/2007 | Kosciusko et al. | |

OTHER PUBLICATIONS

M. Stillger et al, "LEO—DB2's Learning Optimizer", VLDB 2001.*
Probabilistic Optimization of Top N Queries, by Donjerkovic et al., Very Large Data Bases, Proceedings of the 25th International Conference on Very Large Data Bases, pp. 411-422, Year of Publication: 1999, ISBN:1-55860-615-7.*
Office Action dated Apr. 20, 2007 for U.S. Appl. No. 10/936,449.
Office Action dated Apr. 19, 2007 for U.S. Appl. No. 10/936,205.
Office Action dated Sep. 6, 2007 for U.S. Appl. No. 10/936,205.
Office Action dated Feb. 7, 2007 for U.S. Appl. No. 10/936,781.
Office Action dated Jul. 30, 2007 for U.S. Appl. No. 10/936,781.
Office Action dated Feb. 22, 2007 for U.S. Appl. No. 10/936,468.
Office Action dated Aug. 22, 2007 for U.S. Appl. No. 10/936,468.
Office Action dated Jan. 25, 2007 for U.S. Appl. No. 10/935,906.
Office Action dated Aug. 9, 2007 for U.S. Appl. No. 10/935,906.
Office Action dated Jan. 24, 2007 for U.S. Appl. No. 10/936,779.
Office Action dated Aug. 22, 2007 for U.S. Appl. No. 10/936,779.
Office Action dated Mar. 9, 2007 for U.S. Appl. No. 10/936,469.
Office Action dated Oct. 17, 2007 for U.S. Appl. No. 10/936,469.
Office Action dated May 1, 2007 for U.S. Appl. No. 10/936,426.
Office Action dated Sep. 6, 2007 for U.S. Appl. No. 10/936,426.
Office Action dated Jan. 26, 2007 for U.S. Appl. No. 10/936,427.
Office Action dated Aug. 22, 2007 for U.S. Appl. No. 10/936,427.
Office Action dated Jan. 25, 2007 for U.S. Appl. No. 10/936,778.
Aboulnaga, A. et al. "Self-tuning Histograms: Building Histograms Without Looking at Data", Proceedings of the 1999 ACM SIGMOD International Conference on Management of Data, SIGMOD'99, Philadelphia, PA, 1999, pp. 181-192.
Almeida, et al., "Panasync: Dependency tracking among file copies", Proceedings of the 9th Workshop on ACM SIGOPS European Workshop: Beyond the PC: New Challenges for the Operating System, Kolding, Denmark, 2000, pp. 7-12.
Baldoni, et al., "A Communication-Induced Checkpointing Protocol that Ensures Rollback-Dependency Trackability", 27th Annual International Symposium on Fault-Tolerant Computing, FTCS-27, IEEE, 1997, pp. 68-77.

Baldoni, et al., "Rollback-Dependency Trackability: Visible Characterizations", Proceedings of the 18th Annual ACM Symposium on Principles of Distributed Computing, Atlanta, GA, 1999, pp. 33-42.

Damani, et al, "Optimistic Distributed Simulation Based on Transitive Dependency Tracking", Proceedings of the 11th Workshop on Parellel and Distributed Simulation, IEEE, 1997, pp. 90-97.

Elnozahy, "On the Relevance of Communication Costs of Rollback-Recovery Protocols", Proceedings of the 14th Annual ACM Symposium on Principles of Distributed Computing, Ottawa, Ontario, Canada, 1995, pp. 74-79.

Garcia, et al., "On the Minimal Characterization of the Rollback-Dependency Trackability Property", 21st International Conference on Distributed Computing Systems, IEEE, Apr. 16-19, 2001, pp. 342-349.

Graefe, G. "Dynamic Query Evaluation Plans: Some Course Corrections?", Bulletin of the IEEE Computer Society Technical Committee on Data Engineering, Jun. 2000, vol. 23, No. 2, pp. 3-6.

Hellerstein, J.M. et al. "Adaptive Query Processing: Technology in Evolution", Bulletin of the IEEE Computer Society Technical Committee on Data Engineering, Jun. 2000, vol. 23, No. 2, pp. 7-18.

Kabra, N. et al. "Efficient Mid-Query Re-Optimization of Sub-Optimal Query Execution Plans", Proceedings of the 1998 ACM SIGMOD International Conference on Management of Data, SIGMOD'98, Seattle, WA, 1998, pp. 106-117.

Louboutin, et al., "Comprehensive Distributed Garbage Collection by Tracking Causal Dependencies of Relevant Mutator Events", Proceedings of the 17th International Conference on Distributed Computing Systems, IEEE, May 27-30, 1997, pp. 516-525.

Perry, "Consumer Electronics", IEEE Spectrum, Jan. 1997, vol. 34, No. 1, pp. 43-48.

Sadri, "Integrity Constraints in the Information Source Tracking Method", IEEE Transactions on Knowledge and Data, Feb. 1995, vol. 7, Issue 1, pp. 106-119.

Sreenivas, et al., "Independent Global Snapshots in Large Distributed Systems", Proceedings of the 4th International Conference on High Performance Computing, IEEE, Dec. 18-21, 1997, pp. 462-467.

Kabra et al., "Efficient Mid-Query Re-Optimization of Sub-Optimal Query Execution Plans", SIGMOD '98, Seattle, WA, USA, 1998, pp. 106-117.

Ioannidis et al, "Parametric Query Optimization", Proceedings of the 18 VLDB Conference, Vancouver, BC, Canada 1992, pp. 103-114.

Avnur, R. et al. "Eddies: Continuously Adaptive Query Processing" Proceedings of the 2000 ACM SIGMOD International Conference on Management of Data (SIGMOD '00), Dallas, TX, May 15-18, 2000, pp. 261-272.

Blakeley, J.A. et al. "Experiences Building the Open OODB Query Optimizer" Proceedings of the 1993 ACM SIGMOD International Conference on Management of Data (SIGMOD '93), Washington, DC, May 25-28, 1993, pp. 287-296.

Bruno, N. et al. "STHoles: A Multidimensional Workload-Aware Histogram" Proceedings of the 2001 ACM SIGMOD International Conference on Management of Data (SIGMOD '01), Santa Barbara, CA, May 21-24, 2001, pp. 211-222.

Bruno, N. et al. "Exploiting Statistics on Query Expressions for Optimization" Proceedings of the 2002 ACM SIGMOD International Conference on Data Management (SIGMOD '02), Madison, WI, Jun. 4-6, 2002, pp. 263-274.

Chaudhuri, S. "An Overview of Query Optimization in Relational Systems" Proceedings of the ACM SIGACT-SIGMOD-SIGART Symposium on Principles of Database Systems (PODS '98), Seattle, WA, Jun. 1-4, 1998, pp. 34-43.

Chaudhuri, S. et al. "Rethinking Database System Architecture: Towards a Self-Tuning RISC-style Database System" Proceedings of the 26th International Conference on Very Large Databases (VLDB 2000), Cairo, Eqypt, Sep. 10-14, 2000, pp. 1-10.

Chen, C.M. et al. "Adaptive Selectivity Estimation Using Query Feedback" Proceedings of the 1994 ACM SIGMOD International Conference on Management of Data (SIGMOD '94), Minneapolis, MN, May 24-27, 1994, pp. 161-172.

Derr, M.A. "Adaptive Query Optimization in a Deductive Database System" Proceedings of the 2nd International Conference on Information and Knowledge Management (CIKM '93), Washington, DC, Nov. 1-5, 1993, pp. 206-215.

Ganek, A.G. et al. "The dawning of the autonomic computing era" IBM Systems Journal, 2003, vol. 42, No. 1, pp. 5-18.

Gassner, P. et al. "Query Optimization in the IBM DB2 Family" Data Engineering, Dec. 1993, vol. 16, No. 4, pp. 4-18.

Getoor, L. et al. "Selectivity Estimation using Probabilistic Models" Proceedings of the 2001 ACM SIGMOD International Conference on Management of Data (SIGMOD '01), Santa Barbara, CA, May 21-24, 2001, pp. 461-472.

Gorman, T. "The Search for Intelligent Life in the Cost-Based Optimizer" Jul. 2001, v1.0, pp. 1-11.

IBM "DB2 Universal Database Slashes Administration Costs by Reducing Time Spent on Administrative Tasks by up to 65 Percent" MarketWire, Sep. 9, 2004, pp. 1-3, located at http://www.marketwire.com/mw/release_html-b1?release_id=72387.

Ives, Z.G. et al."An Adaptive Query Execution System for Data Integration" Proceedings of the 1999 ACM SIGMOD International Conference on Management of Data (SIGMOD '99), Philadelphia, PA, Jun. 1-3, 1999, pp. 299-310.

L1ghtstone, S.S. et al. "Toward Autonomic Computing with DB2 Universal Database" ACM SIGMOD Record, Sep. 2002, vol. 31, No. 3, pp. 55-61.

Markl, V. et al. "LEO: An autonomic query optimizer for DB2" IBM Systems Journal, 2003, vol. 42, No. 1, pp. 98-106.

Scheuermann, P. et al. "Adaptive Algorithms for Join Processing in Distributed Database Systems" Distributed and Parallel Databases, 1997, vol. 5, pp. 233-269.

Slivinskas, G. et al. "Adaptable Query Optimization and Evaluation in Temporal Middleware" Proceedings of the 2001 ACM SIGMOD International Conference on Management of Data (SIGMOD '01), Santa Barbara, CA, May 21-24, 2001, pp. 127-138.

Valentin, G. et al. "DB2 Advisor: An Optimizer Smart Enough to Recommend Its Own Indexes" Proceedings of the 16th International Conference on Data Engineering, Feb. 29-Mar. 3, 2000, pp. 101-110.

Zilio, D. et al. "Self-Managing Technology in IBM DB2 Universal Database8" Proceedings of the 10th International Conference on Information and Knowledge Management (CIKM '01), Atlanta, GA, Nov. 5-10, 2001, pp. 541-543.

Office Action dated Nov. 25, 2008 for U.S. Appl. No. 10/935,906.
Office Action dated Apr. 9, 2008 for U.S. Appl. No. 10/935,906.
Office Action dated Oct. 31, 2008 for U.S. Appl. No. 10/936,779.
Office Action dated May 13, 2008 for U.S. Appl. No. 10/936,779.
Office Action dated Dec. 15, 2008 for U.S. Appl. No. 10/936,426.
Office Action dated Sep. 23, 2008 for U.S. Appl. No. 10/936,426.
Office Action dated Mar. 20, 2008 for U.S. Appl. No. 10/936,426.
Office Action dated Oct. 16, 2008 for U.S. Appl. No. 10/936,205.
Office Action dated Mar. 24, 2008 for U.S. Appl. No. 10/936,205.
Office Action dated Nov. 10, 2008 for U.S. Appl. No. 10/936,781.
Office Action dated Apr. 1, 2008 for U.S. Appl. No. 10/936,781.
Office Action dated Oct. 15, 2008 for U.S. Appl. No. 10/936,468.
Office Action dated Mar. 18, 2008 for U.S. Appl. No. 10/936,427.
Office Action dated Apr. 2, 2008 for U.S. Appl. No. 10/936,468.
Office Action dated Sep. 22, 2008 for U.S. Appl. No. 10/936,449.
Office Action dated Dec. 29, 2008 for U.S. Appl. No. 10/936,468.
Office Action dated Dec. 11, 2008 for U.S. Appl. No. 10/936,469.
Office Action dated May 29, 2008 for U.S. Appl. No. 10/936,469.
Office Action dated Oct. 8, 2008 for U.S. Appl. No. 10/936,778.
Office Action dated Jul. 24, 2008 for U.S. Appl. No. 10/936,778.
Office Action dated Jan. 22, 2009 for U.S. Appl. No. 10/936,778.
Notice of Allowance dated Feb. 4, 2010 for U.S. Appl. No. 10/936,778.
Notice of Allowance dated Jan. 27, 2010 for U.S. Appl. No. 10/936,781.
Notice of Allowance dated May 6, 2009 for U.S. Appl. No. 10/936,205.
Office Action dated Sep. 6, 2007 for U.S. Appl. No. 10/936,449.
Office Action dated Mar. 28, 2008 for U.S. Appl. No. 10/936,449.
Office Action dated Mar. 4, 2009 for U.S. Appl. No. 10/936,449.
Office Action dated Apr. 3, 2009 for U.S. Appl. No. 10/936,468.
Office Action dated May 11, 2009 for U.S. Appl. No. 10/935,906.
Office Action dated May 12, 2009 for U.S. Appl. No. 10/936,779.
Office Action dated May 28, 2009 for U.S. Appl. No. 10/936,469.
Office Action dated Jul. 2, 2009 for U.S. Appl. No. 10/936,778.
Office Action dated Mar. 31, 2009 for U.S. Appl. No. 10/936,427.

Final Office Action dated Dec. 8, 2009 for U.S. Appl. No. 10/936,779.
Final Office Action dated Nov. 20, 2009 for U.S. Appl. No. 10/935,906.
Final Office Action dated Nov. 12, 2009 for U.S. Appl. No. 10/936,781.
Notice of Allowance dated Sep. 29, 2009 for U.S. Appl. No. 10/936,205.
Final Rejection dated Nov. 12, 2009 for U.S. Appl. No. 10/936,468.
Notice of Allowance dated Sep. 23, 2009 for U.S. Appl. No. 10/936,449.

* cited by examiner

US 7,805,411 B2

AUTO-TUNING SQL STATEMENTS

CROSS-REFERENCE TO RELATED APPLICATIONS

This application claims the benefit of U.S. Provisional Application No. 60/500,490, filed Sep. 6, 2003, which is incorporated herein by reference in its entirety. This application is related to co-pending applications "SQL TUNING SETS," with U.S. application Ser. No. 10/936,449; "SQL PROFILE," with U.S. application Ser. No. 10/936,205; "GLOBAL HINTS," with U.S. application Ser. No. 10/936,781; "SQL TUNING BASE," with U.S. application Ser. No. 10/936,468; "AUTOMATIC LEARNING OPTIMIZER," with U.S. application Ser. No. 10/935,906; "AUTOMATIC PREVENTION OF RUN-AWAY QUERY EXECUTION," with U.S. application Ser. No. 10/936,779; "METHOD FOR INDEX TUNING OF A SQL STATEMENT, AND INDEX MERGING FOR A MULTI-STATEMENT SQL WORKLOAD, USING A COST-BASED RELATIONAL QUERY OPTIMIZER," with U.S. application Ser. No. 10/936,469; "SQL STRUCTURE ANALYZER," with U.S. application Ser. No. 10/936,426; "HIGH LOAD SQL DRIVEN STATISTICS COLLECTION," with U.S. application Ser. No. 10/936,427; "AUTOMATIC SQL TUNING ADVISOR," with U.S. application Ser. No. 10/936,778, all of which are filed Sep. 7, 2004 and are incorporated herein by reference in their entirety.

FIELD OF THE INVENTION

This invention is related to the field of electronic database management.

BACKGROUND AND SUMMARY

SQL statements can perform poorly because the query optimizer fails to select the best execution plan and selects instead a sub-optimal one. These poorly performing SQL statements can have a catastrophic impact on the performance of an application. Not only can they greatly impact the response time of the system, but they can also affect other performance characteristics of the database system by consuming too many resources such as CPU, I/O, temporary disk space, and memory. As a result, the entire application throughput can be impacted up to the point where the application is no longer functioning to an acceptable level. In fact, a single poorly performing SQL statement has the potential to choke a system and bring it down to its knees.

Usually the selection of a sub-optimal execution plan is based on inaccurate estimates, or cardinalities, of intermediate query results. Based on these estimated cardinalities, a cost model is applied by the optimizer to select an execution plan that is cost efficient for a statement. Unfortunately, because of the estimation errors, the optimizer ends up picking a sub-optimal execution plan.

Several factors can cause appreciable errors in the optimizer estimates and lead the optimizer to generate a sub-optimal plan. Some of these factors are: (1) Use of internal default selectivity estimates when statistics are missing (e.g., unanalyzed tables, temporary tables), or when predicates are complex. (2) Presence of data correlation in two or more columns of a table. (3) Skewed or sparse join relationship between two or more tables. (4) Existence of data correlation between columns of two or more tables. (5) Not accounting for the caching of index and data blocks in cost calculations. 6) Not accounting for concurrent execution of a query or several queries together in resource cost calculations.

When the optimizer fails to find the optimal plan, the plan can be manually tuned. To manually tune a sub-optimal execution plan, an application developer needs to determine a better execution plan for that statement among a virtually unlimited number of alternatives. Then the developer needs to force the optimizer to generate the better execution plan. This is accomplished today by using conventional optimizer hints, which are optimizer directives that are added by the developer to the text of the SQL statement.

Performing the manual SQL tuning process is very painful and difficult, because it has to be done by a developer who has a high level of expertise in query optimization. Second, it is a time consuming process because the text of the SQL statement itself has to be changed to include the optimizer directives. Furthermore, each statement is unique and needs to be dealt with individually, and moreover, the number of statements can be very large. Finally, the manual SQL tuning activity is a continuous task because the SQL workload changes, e.g., when new application modules are deployed. Also, changes in data and access structures (e.g., drop or create index) are very likely to cause changes in the execution plans, forcing the application developer to start over again.

A method of automatically tuning database query language statements allows the optimizer to identify one or more mistakes that are made when generating an execution plan, and allow the optimizer to correct the mistake itself. For example, one embodiment of the method to automatically tune an execution plan for a statement includes receiving, at the optimizer, a statement and performance information related to the statement. Then, the optimizer determines whether one or more performance statistics of the statement are available or unavailable in the performance information. The method then collects each unavailable statistic, so that these statistics are available to the optimizer during generation of the execution plan.

DETAILED DESCRIPTION

Overview

Figure 1:
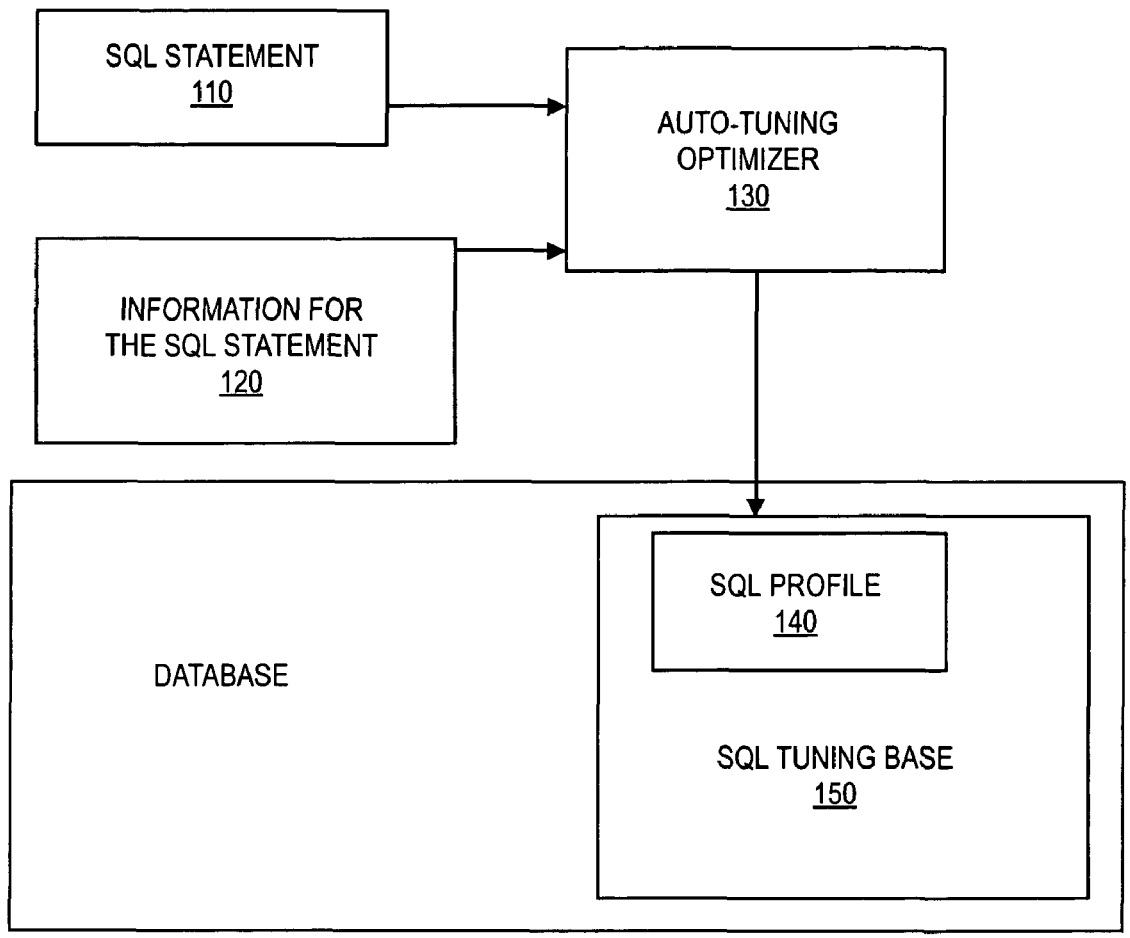
FIG. 1 shows an example of a device that can automatically tune a SQL statement.

The embodiments of the invention are described using the term "SQL", however, the invention is not limited to just this exact database query language, and indeed may be used in conjunction with other database query languages and constructs.

The auto tuning optimizer is a query optimizer that performs a tuning process. Compared to a regular query optimizer, the auto tuning optimizer performs automated tuning tasks during the compilation of a SQL statement. The automated tuning tasks include executing recursive queries to verify optimizer estimates, to verify freshness of statistics, and to verify the size of an object in terms of blocks and rows in case its statistics are missing. The auto tuning optimizer also looks at the past execution history of the SQL statement being compiled to determine a correct optimization mode to use.

By generating the auto tuning hints, the optimizer can fix its own errors to find the best execution plan. Thus, by taking time to find and correct errors, the auto tuning optimizer can self correct the information that it uses for building execution plans. The auto tuning optimizer builds a set of auto tuning hints which the optimizer can then use to find the best execution plan for the SQL statement. The auto tuning hints that are built can be stored in a database. When an optimizer builds an execution plan for the statement, the auto tuning hints are sent to the optimizer and are used to help the optimizer generate the execution plan.

The auto tuning hints may be generated based on a cost-benefit analysis of the time spent performing the auto tuning process with the reduced time and increased efficiency of an execution built with using the auto tuning hints. For example, if the optimizer is aware that a given statement has an execution plan that will take a few days to complete, and the optimizer estimates that the auto tuning hints can be generated in a few seconds, then the auto tuning optimizer can perform the auto tuning process to build the auto tuning hints. The auto tuning optimizer can use these newly generated auto tuning hints to generate an improved execution plan for the statement. The auto tuning optimizer can also identify a query that has been executing longer than predicted, generate auto tuning hints for the statement, and build an improved execution plan for the statement with the auto tuning hints. If the new plan can be executed in significantly less time, than the current plan, then the current plan can be aborted and the new plan can be run.

The tuning tasks performed by the auto tuning optimizer can detect and remove errors present in the optimizer's own estimates when a SQL statement is compiled under the special auto-tune mode. By reducing or eliminating these mistakes, the optimizer can select a better execution plan. For example, after the tuning process detects an error in an estimate, the error is removed or reduced by applying an adjustment factor to it. The adjustment factor for a given estimate is remembered by generating a hint called auto-tuning hint. Auto tuning hints are also generated to adjust stale statistics, or to supply missing statistics for tables and indexes. Further, the auto-tuning hints are used to store and supply relevant information based on past execution history of the SQL statement, which is used to determine the correct optimization mode to use.

FIG. 1 shows an example of a device that can automatically tune a SQL statement. A statement, 110, and information related to the statement, 120, are input to an auto-tuning optimizer 130. The optimizer 130 identifies statistics referenced by the statement, and determines if the statistics are available and accurate. For each unavailable or inaccurate statistic, the optimizer generates an auto-tuning hint to adjust or correct the statistic. The optimizer also generates correction factors for table and join estimates related to the statement. Auto-tuning hints to set parameters for an optimizer or an execution engine are also determined. In one embodiment, the set of auto-tuning hints may be placed in profile 140 and stored in tuning base 150 of the database.

Figure 2:
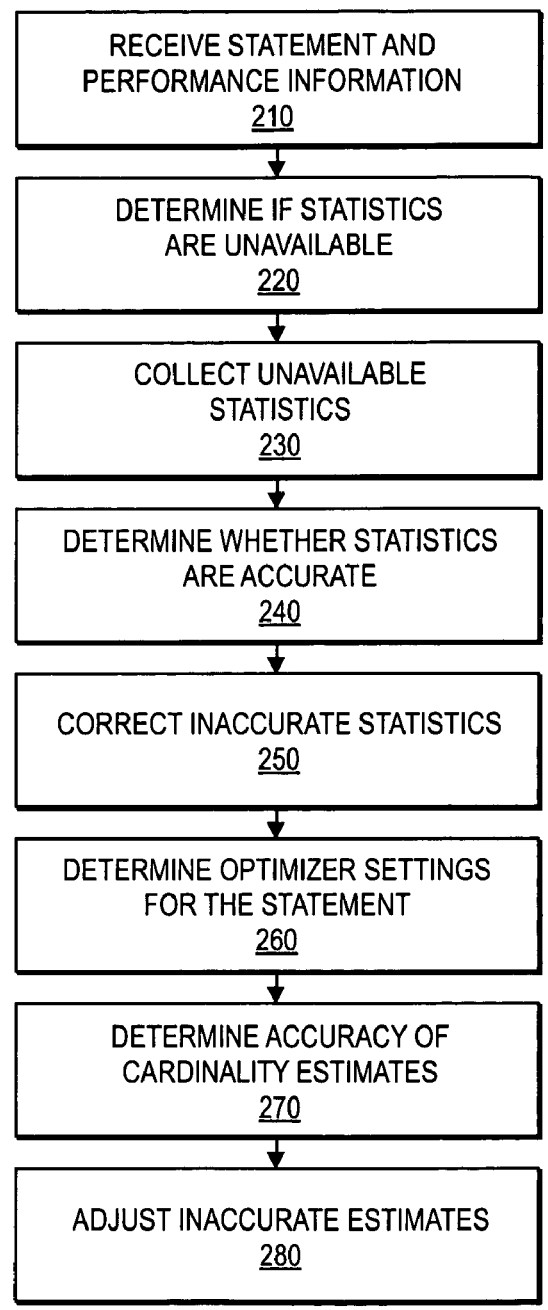
FIG. 2 shows an example of a method to automatically tune a SQL statement.

FIG. 2 shows an example of a method to automatically tune a SQL statement. The SQL statement and performance information related to the statement are received, 210. The auto-tuning optimizer determines whether one or more performance statistics of the statement are available in the performance information, 220. Information for each unavailable statistic is collected, 230. The auto-tuning optimizer determines whether each performance statistic is accurate, 240. An auto-tuning hint to correct each inaccurate statistic is determined, 250. During the auto-tuning process, one or more optimizer settings for the statement can be determined based on the performance information, 260. An accuracy of each join estimate of the statement is determined, 270, and adjustment factors are generated to improve the accuracy of the estimates, 280. For example, the accuracy of join estimates can be determined by recursively executing one or more portions of the statement. The recursive execution may be performed by executing the portions a number n of times, and during a $j^{th}$ execution, determining one or more j-table join estimates.

The auto-tuning process of correcting statistics and estimates is therefore a bottom-up process, from general information to more specific information. For example, the basic statistics are the first to be evaluated and corrected during this process, because this information can be used by most, if not all, of the possible plans in the search space. Then, single table estimates are verified. For example, the predicates attached to one table are verified. Then, verification of 2-table join estimates is performed before verification of 3-table join estimates, because the 2-table join estimates will be more useful to determining an optimal plan than the 3-table join estimates. Therefore, if the process ends before all of the statistics and estimates can be verified, then the process will have verified the statistics and estimates that are most helpful in generating an optimal execution plan.

The set of auto-tuning hints for the SQL statement are grouped together in a SQL profile which is associated with the SQL statement and is stored persistently in a SQL repository. The SQL profile is discussed in greater detail in co-pending U.S. application "SQL PROFILE," filed Sep. 7, 2004, and is incorporated herein by reference in its entirety. The SQL repository is discussed in detail in co-pending U.S. application "SQL TUNING BASE," filed Sep. 7, 2004, and is incorporated herein by reference in its entirety.

When same SQL statement is compiled by the optimizer under normal mode, the auto tuning hints from the corresponding SQL profile are retrieved from the SQL repository to help the optimizer produce a well-tuned plan. Hence, the tuning process can be performed only once, and the resulting hints can be reused many times.

Figure 3:
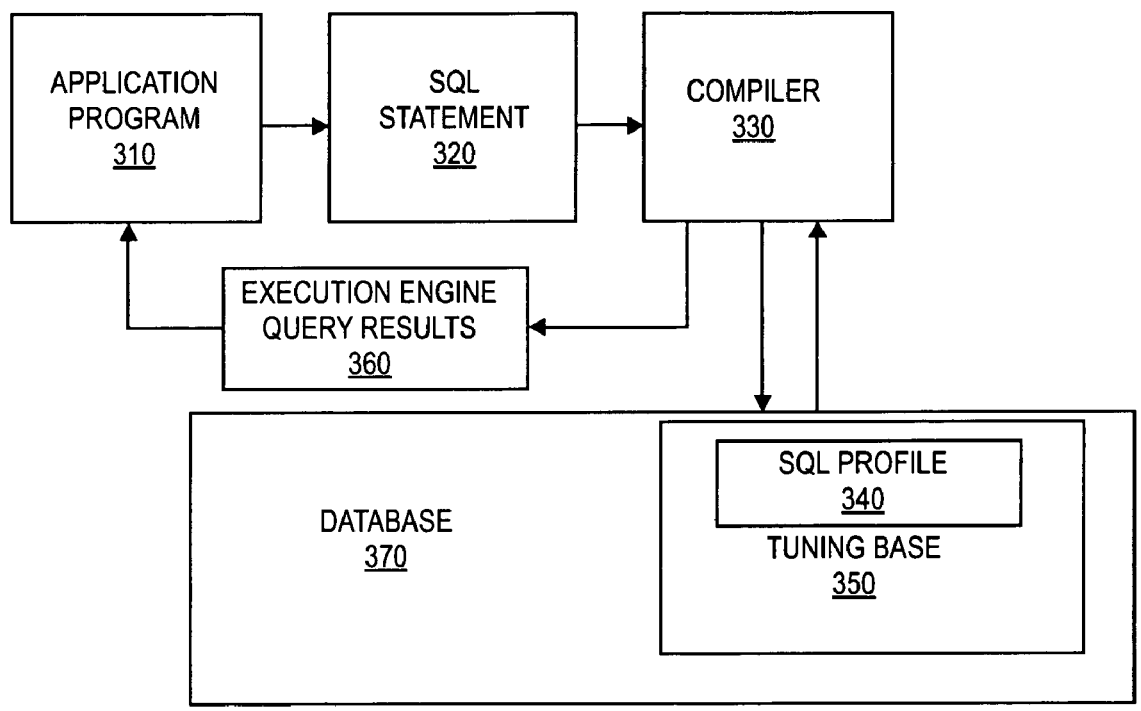
FIG. 3 shows an example of a device to retrieve the SQL profile during compilation of the statement.

FIG. 3 shows an example of a device to retrieve the SQL profile during compilation of the statement. Application program 310, which is running on a computer system, issues statement 320. The compiler 330 retrieves the profile 340 for the statement from tuning base 350. The set of hints in the profile is used to generate a well-tuned execution plan. Query results 360 are then retrieved from database 370 and returned to application 310.

Automatically Determining Optimizer Settings

This is an initial action of the auto-tuning process. The goal is to determine the appropriate settings and parameters for optimizer related functions. For example, parameters such as the optimizer mode, the optimizer level, the optimizer goal (i.e. optimize for response time or resource), a degree of parallelism, or an index-caching ratio can be determined during the auto tuning process. These parameters can be determined by looking at information such as past execution history of the SQL statement being tuned. The parameters may also be set based on information such as bind information, compilation environment information, information related to a degree of parallelism based on a number of CPUs, and a time limit to perform the auto-tuning process. This information can be automatically collected by the database system itself (see Automatic Workload Repository, AWR) or provided to the auto tuning optimizer by other methods.

For example, an appropriate value for the optimizer mode can be determined based on the execution history of the statement being tuned if a sufficient number of execution history statistics have been collected for the statement. Suppose the statement has been executed ten times, then the auto-tuning process can identify the number of rows that were fetched from the results returned by the executed statements, and set the appropriate parameter for the optimizer mode based on the determined amount. In this example, if the complete execution count is less than ten percent of the total execution count, then the optimizer mode can set the plan to return N first rows, where N is the total rows processed divided by the total execution count. If the completed execution count is greater than or equal to ninety percent of the total execution count, then the optimizer mode is set to return all rows. (The total execution count represents the total number of executions of the statement, and the complete execution count represents a fraction of that total for which all the rows were fetched. The total rows processed represents the cumulative number of rows fetched from that cursor). Also, an index-caching ratio can be determined from an analysis of the execution history.

Statistic Verification

The accuracy of each statistic used by the optimizer is automatically verified. Appropriate adjustments can be generated to correct inaccurate statistics. These adjustments can be placed in a SQL profile for the statement in the form of auto-tuning hints. Statistics adjustments are generated as follows.

The auto-tune optimizer automatically generates a list of statistics referenced by the SQL statement when the statement is being optimized. For example, if a table T1 has a column C1 and a predicate B1, the optimizer uses the NDV (Number of Distinct Values) of column C1 to determine the selectivity of the predicate C1=:B1. Assuming that the statement has an equality predicate on T1.C1, the NDV(T1.C1) statistic is added to the list of statistics used by the optimizer when the statement is optimized under the auto-tuning mode.

When a query is optimized, each logged statistic which has not been verified can be verified by re-collecting the statistic, and comparing the value of the re-collected statistic with the value of the corresponding logged statistic. If the two values differ, an adjustment factor is generated, stored in the profile, and used to improve the accuracy of the value of the logged statistic.

The statistics can be verified at round 0 of the recursive portion of the auto-tuning process. Round 0 is the first recursive auto-tune round, which is used mainly to verify base object statistics, to determine an initial best join order, and to determine a best cost for each query block of the SQL statement being tuned. After this round, additional statistics, which were not referenced by the original SQL statement, may be verified if new part of the search space, which includes the additional statistics, is explored.

Optimizer Estimate Verification

Optimizer estimates are verified using a multi-round recursive process that analyzes different classes of estimates in a breadth-first order. For example, single table estimates are verified and corrected during the first round. Estimates for 2-table joins are verified in the second round, and estimates for a k-table join are verified in the $k^{th}$ round. The breadth-first order of the tuning process means that the validation of estimates starts at the leaf nodes of a plan tree, and works its way up the tree toward the root node. In other words, it is a bottom-up approach starting with the single table estimates, then going on to 2-table join estimates, then on to k-table join estimates. The bottom-up approach makes sense because the single table estimates are inputs to 2-table join estimates and k-table join estimates are input to (k+1)-table join estimates. Also, if the auto-tuning process reaches a time limit before verifying all estimates, then the bottom-up approach ensures that the most significant estimates are verified first.

It is quite possible that the corrections made to single table estimates may automatically lead to the correction of various join estimates. In general, corrections made to k-table estimates can potentially correct r-table estimates, where r>=(k+1). Correct estimation and hence correct selection of first few leading tables in the join order usually leads to an optimal plan. This means that in most situations it will be sufficient to verify single table estimates and possibly small join estimates to enable the optimizer to pick the right plan.

The corrections made to optimizer estimates in the $k^{th}$ round can assist the optimizer in applying certain query transformations that originally were considered not worthwhile, or vice versa. For example, a query often includes several subqueries, which are also called query blocks. During initial rounds of the auto-tuning process, the optimizer may determine that it is not cost effective to unnest a subquery because of the errors present in some of its estimates. Once these estimates are corrected in subsequent rounds, the optimizer may now determine, based on much more accurate cost estimates, that unnesting the subquery leads to a much more efficient plan.

Therefore, it is possible that, because of the estimate corrections made during previous rounds, a cost-based query transformation results in a new query block structure being added to the execution plan. As a result, the auto tuning optimizer sees a brand new query block, which may include unverified statistics and estimates, during a particular round. To verify the estimates of the new query block, this new query block is processed at round 1, while the other query blocks are processed at higher rounds during the estimate verification process. The verification of optimizer estimates for the new query block proceeds in a multi-round recursive manner.

Another class of estimates which can be verified by the auto-tune optimizer is the class of cost estimates for performing actions in the execution plan. For example, a cost model is used to estimate the cost of performing a full table scan during execution. This cost model can be based on cost component factors such as I/O, CPU and memory performance characteristics. By running and collecting execution statistics (e.g. CPU capacity consumed and number of I/Os generated) for a sample of the table scan operation, the optimizer can adjust the overall cost estimates for that full table scan. For example, some predicates that are evaluated might consume more CPU capacity than previously estimated. Running a sample of the scan operation can reveal that mistake, which can be corrected by generating a cost adjustment hint.

Recursive Query Execution

Auto tuning optimizer addresses estimation errors by verifying its own estimates via recursive query execution and, when necessary, generating corrective actions in the form of adjustment hints. For example, the verification of a single table estimate can be done by dynamically generating a query based on a single table and recursively executing it. The result of the recursive query can be used to determine if the single table estimate contains an appreciable error, and, if so, generate a correction to the estimate in the form of an adjustment hint. The recursive query may use sampling clause to sample data from the table and produce the result much more efficiently. In the first round, several recursive queries may be executed to individually verify different single table estimates. In the next round, a recursive query involving join between two tables can be dynamically generated and executed to verify a 2-table join estimate. In general, during the $k^{th}$ round a recursive query is executed to verify and possibly correct a k-table join estimate. The recursive query can compute the actual result of the k table estimate, or it can compute a sampled estimate using dynamic sampling. The auto tuning rounds are continued until a time limit is reached or there are no more estimates left to verify. The adjustment hints produced during various rounds are consolidated into a SQL profile, which is then stored in the SQL repository.

The verification of an estimate uses an adaptive technique of either using sampled data or fully computing the result. The decision to sample or compute depends on the presence of appropriate predicates in the recursive query and the availability of suitable index access paths. For example, if the recursive query contains a highly selective predicate on a column of an index then it is very efficient to just compute the actual value using the index as an efficient access path, which can be performed relatively quickly. However, if the predicate is not very selective, or no index exists based on predicate column then computing the actual value may take a considerable amount of time. In this case, sampling of data will be an appropriate technique, because sampling can be performed much faster than computing the actual result. Therefore, during a given iteration of the recursive query execution, a value, such as a single table estimate, may be verified by issuing a dynamic compute query for computing the actual value of the estimate, or by issuing a dynamic sampling query for sampling a portion of the table to determine the value of the estimate within an acceptable margin of error.

In the first round of verifying estimates, for example, the optimizer issues a recursive query on each table to find its actual size, to determine if its statistics are stale, and to determine if it is volatile. The first round of recursive query execution can be performed by performing a dynamic compute query with a time limit, or, if the compute query reaches its time limit, by performing a dynamic sampling query to count the number of rows of each table. If dynamic sampling is performed, the sample size can be small, such as 100 blocks, for example. If this sample is too small to return a statistically significant estimate, the sampling size can be increased by doubling the sample size, for example. This dynamic sampling can be repeated with an increased sample size until a statistically valid estimate is determined. In general, if the predicate is very selective, then a compute query works well, because the access path can be determined quickly. If the predicate is not very selective, then dynamic sampling works well as long as the sample is large enough to verify the predicate. (Similar techniques of compute or sample can be used to verify a cost for an operation).

Then, the query result is compared with the table statistics, to identify an error in the cardinality for the table size in the table statistics. Following the table size verification, the single table estimates are verified for those tables that have local predicates specified on them. This verification of table estimates can include verifying effective table cardinality values due to local predicates and verifying distinct cardinalities of the join keys. A dynamic compute query may perform the verification if the table is small, or a dynamic sampling query may be used. In subsequent rounds, the join estimates are verified during a join permutation process.

Time Management

The auto-tune optimizer supports a time limit feature. Checks for remaining time can be made at the end of each join permutation. When time limit is reached, the auto tuning process can be suspended, and corrective actions, which may be in the form of hints, produced by the process can be output, for example, as a SQL profile, along with an indication that auto tuning process did not run to its completion. To increase the efficacy of auto tuning, the time limit can be divided into a number of time slices, with each time slice used as a time limit to verify an individual optimizer estimate. The use of a time slice prevents a single verification taking up most or all of the available time.

For example, the estimate verification process can be concluded after the estimates are verified, or after a time limit is reached. The time limit may be specified for the entire process, or for a given iteration. When the time limit is reached, the estimate verification process may be suspended, and any verified estimates or auto-tune hints produced by the process can be output in the profile, along with an indication that auto tuning process did not run to its completion. Because a bottom-up approach is used, the auto-tuning hints that are produced are useful in generating an optimal plan. Alternatively, if a time limit is reached, such as a time limit for computing a single table estimate, a sampling method for verifying the estimate may be performed.

Even though auto tuning optimizer is given a lot more time than the regular optimizer, it tries to use time very judiciously. To reduce processing time, the optimizer can, at the end of each round, store useful information to be used in the next round so as to make the auto tuning process much more efficient. For example, it can remember the join order of the best plan produced in a given round and use that join order in the next round as the first join permutation to produce a plan with an improved starting cost. The improved starting cost greatly helps in early pruning of join permutations (those that would have led to more expensive plans), and hence reduces the plan search time.

Another time management tool is a cost cutoff analysis. Basically, the auto-tune optimizer verifies an estimate if the cost of the sub-plan for the corresponding query block with this verified estimate is less than the current cost of the sub-plan of the query block without the verified estimate. An initial best cost used by this process can be determined at Round 0, which delays executing the recursive query to round 1 in order to start with a cost cut-off value. This cost cutoff tool allows the optimizer to verify only those estimates that are used in generating the optimal plan, and to ignore the estimates that are used by sub-optimal plans. Therefore, expensive estimates can be skipped, and estimates for less expensive plans can be verified. The cost cutoff tool can therefore be used in pruning the plan search space, as well as avoiding wasteful dynamic verification of many optimizer estimates.

Cost Benefit Computation

When auto tuning optimizer produces a new plan, it needs to compute a cost measure to show the amount of benefit achieved due to auto tuning of a SQL statement. The cost benefit is computed based on the revised cost of the original plan compared to the cost of the new plan. If the cost of the old plan is inaccurate because of errors in the original cardinality and selectivity estimates, a revised costing of the old plan, with errors in the original estimates removed, is performed. The revised cost of the original plan is computed by applying adjustment hints to remove the estimation errors. However, to build the same original plan, the auto tuning optimizer stores the original decisions, which were based on the initial flawed estimates. These original plan decisions are collected and stored in an entity called an outline. The revised cost can be computed using the outline and the adjustment hints.

Therefore, after each iteration, the corrected estimates can be used to revise the cost of the old plan. Also, the corrected estimates can be used to generate a new plan, which is compared with the old plan. If the benefit metric shows a relative improvement of using the new plan instead of the old plan, the new plan is used for the statement. If the old plan is better, the iterative process of estimate verification ends, and the old plan is used.

Auto Tuning Hints

Auto tuning hints are the tuning information generated by the auto-tune optimizer. The hints are used to provide adjustments to the optimizer estimates, or to provide adjustments to stale optimizer statistics. With each successive round of recursive query execution, additional auto tuning hints are generated and stored. A query is often composed of several subqueries, or query blocks. The auto tuning information is generated on a per query block basis, and it includes, for example, the adjustment hints, the cost and join order of the best plan found in a previous round, and the maximum number of rounds required to auto tune a query block.

Statistics adjustment hints (e.g. TABLE_STATS( ), COLUMN_STATS( ), INDEX_STATS( ) hints) are generated to adjust statistics of based objects accessed by the statement being compiled. For example, a NDV adjustment hint is used to correct the distinct cardinality, or the number of distinct values, estimate of a join key. A selectivity adjustment hint is used to correct the index selectivity of an index access path. A statistic adjustment hint contains adjustments to a stale statistic. A cardinality adjustment hint is used to correct the cardinality estimate of a result, such as OPT_ESTIMATE (estimate identifier, adjustment factor). An auto tuning hint can also specify correct optimization parameter or mode to use, such as OPT_PARAM(FIRST_ROWS or ALL_ROWS).

Example

During each round of the estimate verification process, the optimizer can execute a dynamic compute query with a time limit. If the time limit is reached before the estimate is computed, the optimizer can execute a dynamic sampling query. Consider this three table join query:

select t1.x, t2.y, t3.z
from t1, t2, t3
where t1.a=t2.a and t1.b=t3.b and t1.c=1 and t3.d=2;

The process will use a breadth-first order of estimate verification, so that round zero will verify the basic statistics. In the first round, the process will verify the single table estimates. For example, the estimates of table t3 can be verified by executing this dynamic compute query:

Round 1:

```
select /*+ time_limit(30) */
    count(*),
from t3
where t3.d = 2;
```

The time limit hint of 30 indicates to the execution engine to abort the query execution if it continues to executed beyond 30 seconds. If a time-out occurs, then a dynamic sampling query will be issued. The count(*) aggregate in the dynamic compute query verifies the single table estimates for table t3, such as the selectivity of the predicate t3.d=2. This query also measures the distinct cardinality of join key t3.b.

In the second round, the join estimate between tables t1 and t2 is verified by constructing a two-table recursive compute query:

Round 2:

```
select /*+ time_limit (30) */
    count(*),
from t1, t2
where t1.a = t2.a and t1.c = 1;
```

The count (*) aggregate measures the number of matching rows produced by the sample, and measures the number of distinct values of the key that joins to table t3. If the time limit is reached before the estimates are verified, the following two-table dynamic sampling query will be issued:

Round 2:

```
select
    count(*), count (distinct t1.b)
from t1, t2 sample block (0.024)
where t1.a = t2.a and t1.c = 1;
```

In this sampling query, the join between t1 and t2 is one-to-many. The table t2 is sampled because it is on the right side of this join relationship. The sample block percentage is based on an estimate of the size of the join between t1 and t2, which in turn is based on the verified single table estimates of t1 and t2.

In the third round, the verified estimate count from the second round, which is the number of distinct values of the key that joins to table t3, is used in verifying the join selectivity when t3 is joined to the result of t1 and t2. Also used to verify this three-table join estimate are the cardinalities of t1.b and t3.b, which were verified in the first round.

Figure 4:
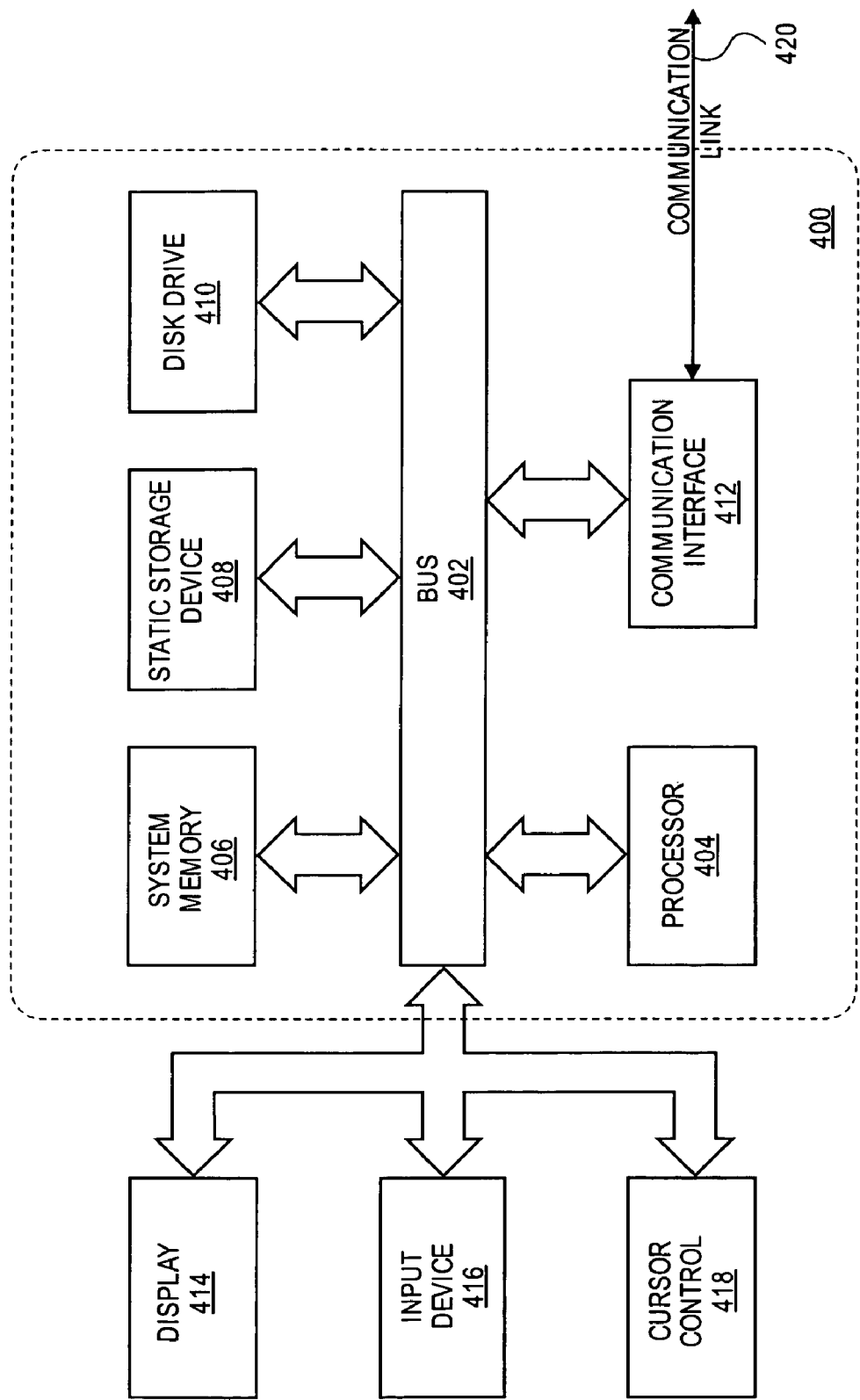
FIG. 4 is a block diagram of a computer system suitable for implementing an embodiment of automatic tuning of SQL statements.

FIG. 4 is a block diagram of a computer system 400 suitable for implementing an embodiment of auto-tuning. Computer system 400 includes a bus 402 or other communication mechanism for communicating information, which interconnects subsystems and devices, such as processor 404, system memory 406 (e.g., RAM), static storage device 408 (e.g., ROM), disk drive 410 (e.g., magnetic or optical), communication interface 412 (e.g., modem or ethernet card), display 414 (e.g., CRT or LCD), input device 416 (e.g., keyboard), and cursor control 418 (e.g., mouse or trackball).

According to one embodiment of the invention, computer system 400 performs specific operations by processor 404 executing one or more sequences of one or more instructions contained in system memory 406. Such instructions may be read into system memory 406 from another computer readable medium, such as static storage device 408 or disk drive 410. In alternative embodiments, hard-wired circuitry may be used in place of or in combination with software instructions to implement the invention.

The term "computer readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as disk drive 410. Volatile media includes dynamic memory, such as system memory 406. Transmission media includes coaxial cables, copper wire, and fiber optics, including wires that comprise bus 402. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 400. According to other embodiments of the invention, two or more computer systems 400 coupled by communication link 420 (e.g., LAN, PTSN, or wireless network) may perform the sequence of instructions to practice the invention in coordination with one another. Computer system 400 may transmit and receive messages, data, and instructions, including program, i.e., application code, through communication link 420 and communication interface 412. Received program code may be executed by processor 404 as it is received, and/or stored in disk drive 410, or other non-volatile storage for later execution.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

We claim:

1. A computer implemented method, comprising:
using at least one computer system configured for:
receiving a database query language statement and performance information related to the database query language statement;
determining whether one or more statistics relating to the database query language statement are available or accurate in the performance information;
determining a hint for a missing or an inaccurate statistic in the performance information;
creating or improving an estimate of a value of an execution of the query language statement by at least recursively determining whether a predicate selectivity exceeds a threshold, wherein
the act of creating or improving the estimate comprises sampling an adjustable portion of data against which the query language statement is to be performed without requiring performance of a full table scan based at least in part upon a relationship between the predicate selectivity and the threshold; and
verifying the estimate by executing the query language statement to perform at least the full table scan based at least in part upon the predicate selectivity, wherein the act of verifying the estimate performs a sample of a result of the full table scan to adjust the estimate.

2. The method of claim 1, further comprising:
determining whether each performance statistic in the performance information is accurate; and
generating the hint for each inaccurate statistic.

3. The method of claim 1, wherein determining whether each performance statistic in the performance information is accurate comprises:
re-collecting the performance statistic; and
comparing the value of the re-collected statistic with the value of the performance statistic in the performance information.

4. The method of claim 1, further comprising:
automatically determining one or more optimizer settings for the statement based on the performance information; and
generating the hint for each determined optimizer setting.

5. The method of claim 4, wherein the performance information is execution history of the statement.

6. The method of claim 5, wherein one of the optimizer settings is an optimizer mode, and automatically determining the optimizer mode comprises:
examining the execution history to determine an average number of rows returned by the statement; and
setting a parameter for the optimizer mode based on the average number of rows.

7. The method of claim 4, wherein the one or more optimizer settings are selected from the group consisting of: an optimizer mode, an optimizer level, an optimizer goal, a degree of parallelism, an index caching ratio.

8. The method of claim 4, wherein the performance information is selected from the group consisting of execution history of the statement, bind information, compilation environment information, information related to a degree of parallelism, a time limit.

9. The method of claim 1, further comprising:
validating table estimates of the statement; and
generating the hint for each validated table estimate.

10. The method of claim 9, wherein validating table estimates comprises:
beginning the validation at leaf nodes of an execution plan tree; and
continuing the validation toward a root node of the execution plan tree.

11. The method of claim 9, wherein validating table estimates comprises:
recursively executing one or more portions of the statement.

12. The method of claim 11, wherein recursively executing comprises:
executing the one or more portions a number it of times; and
during a $j^{th}$ execution, determining one or more j-table join estimates.

13. The method of claim 9, wherein validating comprises:
validating single table estimates.

14. The method of claim 13, wherein validating further comprises:
validating 2-table join estimates.

15. The method of claim 9, wherein validating comprises:
performing a dynamic compute query.

16. The method of claim 9, wherein validating comprises:
performing a dynamic sampling query.

17. The method of claim 16, wherein performing the dynamic sampling query is repeated until a statistically valid estimate is obtained.

18. The method of claim 9, wherein validating is performed until a time limit is reached.

19. The method of claim 1, further comprising:
validating cost estimates for performing actions in an execution plan; and
generating the hint for each validated cost estimate.

20. The method of claim 19, wherein validating cost estimates is performed with a cost model based on cost component factors selected from the group consisting of: input/output (I/O) characteristics, central processing unit (CPU) characteristics, memory performance characteristics.

21. An apparatus, comprising:
at least one computer system configured for:
receiving a database query language statement and performance information related to the database query language statement;
determining whether one or more statistics relating to the database query language statement are available or accurate in the performance information;
determining a hint for a missing or an inaccurate statistic in the performance information; and
creating or improving an estimate of a value of an execution of the query language statement by at least recursively determining whether a predicate selectivity exceeds a threshold, wherein
the act of creating or improving the estimate comprises sampling an adjustable portion of data against which the query language statement is to be performed without requiring performance of a full table scan based at least in part upon a relationship between the predicate selectivity and the threshold; and
verifying the estimate by executing the query language statement to generate the hint to perform at least the full table scan based at least in part upon the predicate selectivity, wherein the act of verifying the estimate performs a sample of a result of the full table scan to adjust the estimate.

22. The apparatus of claim 21, further comprising:
means for determining whether each performance statistic in the performance information is accurate; and
means for generating the query optimization hint for each inaccurate statistic.

23. The apparatus of claim 21, wherein the computer system configured for determining whether one or more statistics are available or accurate comprises:
means for re-collecting the performance statistic; and
means for comparing the value of the re-collected statistic with the value of the performance statistic in the performance information.

24. The apparatus of claim 21, further comprising:
means for automatically determining one or more optimizer settings for the statement based on the performance information; and
means for generating the hint for each determined optimizer setting.

25. The apparatus of claim 21, further comprising:
means for validating table estimates of the statement; and
means for generating the hint for each validated table estimate.

26. The apparatus of claim 21, further comprising:
means for validating cost estimates for performing actions in an execution plan; and
means for generating the hint for each validated cost estimate.

27. A volatile or non-volatile computer readable storage medium storing a computer program of instructions, which, when executed by a computer system, cause the computer system to perform a method, the method comprising:
receiving a database query language statement and performance information related to the database query language statement;
determining whether one or more statistics relating to the database query language statement are available or accurate in the performance information;
determining a hint for a missing or an inaccurate statistic in the performance information; and
creating or improving an estimate of a value of an execution of the query language statement by at least recursively determining whether a predicate selectivity exceeds a threshold, wherein
the act of creating or improving the estimate comprises sampling an adjustable portion of data against which the query language statement is to be performed without requiring performance of a full table scan based at least in part upon a relationship between the predicate selectivity and the threshold; and
verifying the estimate by recursively executing the query language statement to generate the hint to adjust at least the adjustable portion of the data by performing at least the full table scan based at least in part upon the predicate selectivity, wherein the act of verifying the estimate performs a sample of the full table scan to adjust the estimate.

28. The medium of claim 27, wherein the method further comprises:
determining whether each performance statistic in the performance information is accurate; and
generating the query optimization hint for each inaccurate statistic.

29. The medium of claim 27, wherein determining whether each performance statistic in the performance information is accurate comprises:
re-collecting the performance statistic;
comparing the value of the re-collected statistic with the value of the performance statistic in the performance information.

30. The medium of claim 27, wherein the method further comprises:
automatically determining one or more optimizer settings for the statement based on the performance information; and
generating the query optimization hint for each determined optimizer setting.

31. The medium of claim 27, wherein the method further comprising:
validating table estimates of the statement; and
generating the query optimization hint for each validated table estimate.

32. The medium of claim 27, wherein the method further comprising:
validating cost estimates for performing actions in an execution plan; and
generating the query optimization hint for each validated cost estimate.

33. The medium of claim 32, wherein validating cost estimates is performed with a cost model based on cost component factors selected from the group consisting of: input/output (I/O) characteristics, central processing unit (CPU) characteristics, memory performance characteristics.

34. A computer implemented method, comprising:
using at least one computer system configured for:
receiving a SQL statement for a database for compilation, at an auto tuning optimizer and performance information related to the SQL statement; and
determining whether one or more statistics relating to the SQL statement are available or accurate in the performance information;

determining a hint for a missing or an inaccurate statistic in the performance information;

creating or improving an estimate of a value determined by the auto-tuning optimizer for generating an execution plan by sampling an adjustable portion of data of the database without requiring performance of a full table scan and by using a hint based at least in part upon a recursive determination of a relationship between a predicate selectivity and a threshold or a determination of whether an index for the SQL statement exists; and verifying the estimate by executing the SQL statement to perform at least the full table scan based at least in part upon the predicate selectivity, wherein the act of verifying the estimate performs a sample of a result of the full table scan to adjust the estimate.

35. The method of claim 34, wherein self-correcting information comprises:

building one or more auto timing hints to help the optimizer generate a best execution plan for the statement.

36. The method of claim 34, further comprising:

setting a time limit for performing the self-correcting.

37. The method of claim 36, wherein setting the time limit comprises:

predicting an execution time of a current plan for the SQL statement; and setting the time limit as a fraction of the predicted execution time.

38. The method of claim 34, further comprising:

building a new execution plan for the SQL statement using the self-corrected information;

determining a cost of the new execution plan; and comparing the cost of the new execution plan with a cost of an old execution plan for the SQL statement.

39. The method of claim 34, further comprising:

using self-corrected information to build auto tuning hints to correct base statistics.

40. The method of claim 39, wherein the auto tuning hints that are built to correct base statistics are selected from the group consisting of:

column statistics, table statistics, and index statistics.

41. The method of claim 34, further comprising:

using the self-corrected information to build auto tuning hints to correct optimizer settings.

42. The method of claim 34, further comprising:

using the self-corrected information to build auto tuning hints to correct optimizer cardinality estimates or optimizer cost estimates.

43. The computer implemented method of claim 1, wherein the hint comprises a first adjustment to the adjustable portion of data to determine an amount of the data that is needed for the estimate to be statistically valid.

44. The computer implemented method of claim 1, wherein the hint further comprises a second adjustment to the predicate selectivity to adjust an access path for recursive execution of the query language statement.

* * * * *

UNITED STATES PATENT AND TRADEMARK OFFICE
CERTIFICATE OF CORRECTION

PATENT NO.        : 7,805,411 B2
APPLICATION NO.   : 10/935908
DATED             : September 28, 2010
INVENTOR(S)       : Mohamed Ziauddin et al.

It is certified that error appears in the above-identified patent and that said Letters Patent is hereby corrected as shown below:

On page 3, in column 1, under "Other Publications", line 6, delete "Parellel" and insert -- Parallel --, therefor.

On page 3, in column 1, under "Other Publications", line 65, delete "Eqypt," and insert -- Egypt, --, therefor.

On page 3, in column 2, under "Other Publications", line 19, delete "L1ghtstone," and insert -- Lightstone, --, therefor.

In column 12, line 27, in claim 8, delete "of" and insert -- of: --, therefor.

In column 12, line 46, in claim 12, delete "it" and insert -- n --, therefor.

In column 12, line 62-63, in claim 34, delete "compilation," and insert -- compilation --, therefor.

Signed and Sealed this
Seventeenth Day of May, 2011

David J. Kappos
*Director of the United States Patent and Trademark Office*